United States Patent
Subburaj et al.

(10) Patent No.: US 11,782,148 B2
(45) Date of Patent: Oct. 10, 2023

(54) RADAR SYSTEM

(71) Applicant: TEXAS INSTRUMENTS INCORPORATED, Dallas, TX (US)

(72) Inventors: Karthik Subburaj, Bangalore (IN); Sandeep Rao, Bangalore (IN); Sriram Murali, Bangalore (IN); Karthik Ramasubramanian, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 777 days.

(21) Appl. No.: 16/363,719

(22) Filed: Mar. 25, 2019

(65) Prior Publication Data

US 2020/0309939 A1  Oct. 1, 2020

(51) Int. Cl.
*G01S 13/58* (2006.01)
*G01S 7/35* (2006.01)
*G01S 13/34* (2006.01)

(52) U.S. Cl.
CPC ............ *G01S 13/584* (2013.01); *G01S 7/352* (2013.01); *G01S 7/356* (2021.05); *G01S 13/343* (2013.01); *G01S 13/345* (2013.01)

(58) Field of Classification Search
CPC .... G01S 13/343; G01S 13/931; G01S 13/584; G01S 13/34; G01S 7/35; G01S 7/023; G01S 13/345; G01S 7/032; G01S 7/282; G01S 7/352; G01S 7/356; G01S 13/42; G01S 17/34; G01S 7/4911; G01S 13/347; G01S 13/82; G01S 7/484; G01S 7/2886; G01S 7/4056; G01S 2013/93271; G01S 2013/93272; G01S 2013/93274;

(Continued)

(56) References Cited

U.S. PATENT DOCUMENTS 5,751,240 A * 5/1998 Fujita ..................... G01S 13/87
342/70
7,071,868 B2 * 7/2006 Woodington ............ H01Q 3/24
342/70

(Continued)

FOREIGN PATENT DOCUMENTS

DE  102012220879 A1  5/2014
WO     2018081481 A1  3/2018

OTHER PUBLICATIONS

International Search Report for PCT/US2020/024586 dated Jun. 18, 2020.

(Continued)

*Primary Examiner* — Olumide Ajibade Akonai
(74) *Attorney, Agent, or Firm* — Michael T. Gabrik; Frank D. Cimino

(57) ABSTRACT

Aspects of the present disclosure provide for a radar system including a radar IC including a timing engine, a local oscillator, and a modulator. The timing engine is configured to generate one or more chirp control signals. The local oscillator is configured to receive the one or more chirp control signals and generate a frame including a first sequence of chirps according to the one or more chirp control signals. The modulator is configured to modulate the first sequence of chirps to generate a second sequence of chirps so the frame includes the first sequence of chirps and the second sequence of chirps offset by a first frequency value.

20 Claims, 6 Drawing Sheets

(58) Field of Classification Search
CPC ...... G01S 13/536; G01S 7/4008; G01S 13/32; G01S 13/243; G01S 7/2883; H04B 2001/6912
See application file for complete search history.

(56) References Cited

U.S. PATENT DOCUMENTS

| | | | |
|---|---|---|---|
| 9,024,809 B2* | 5/2015 | Testar | G01S 13/584 342/128 |
| 9,841,498 B1 | 12/2017 | Campbell et al. | |
| 10,012,726 B2* | 7/2018 | Schoor | G01S 13/345 |
| 10,775,489 B2* | 9/2020 | Rao | G01S 7/354 |
| 2005/0179582 A1* | 8/2005 | Woodington | H01Q 1/42 342/70 |
| 2014/0197983 A1 | 4/2014 | Reuter | |
| 2015/0153445 A1 | 6/2015 | Jansen | |
| 2015/0362584 A1* | 12/2015 | Jenkins | G01S 7/4056 342/171 |
| 2016/0018511 A1* | 1/2016 | Nayyar | G01S 13/343 342/27 |
| 2016/0041260 A1 | 2/2016 | Cao et al. | |
| 2016/0091599 A1* | 3/2016 | Jenkins | G01S 13/343 342/165 |
| 2016/0124075 A1 | 5/2016 | Vogt et al. | |
| 2016/0146931 A1* | 5/2016 | Rao | H01Q 1/3233 342/59 |
| 2016/0187462 A1* | 6/2016 | Altus | G01S 13/343 342/175 |
| 2017/0090014 A1* | 3/2017 | Subburaj | G01S 7/4052 |
| 2017/0090015 A1 | 3/2017 | Breen et al. | |
| 2017/0115377 A1* | 4/2017 | Giannini | G01S 7/35 |
| 2017/0192847 A1* | 7/2017 | Rao | G06F 3/064 |
| 2018/0011170 A1* | 1/2018 | Rao | G01S 7/354 |
| 2018/0074173 A1 | 3/2018 | Trotta et al. | |
| 2018/0203105 A1* | 7/2018 | Kuehnle | G01S 13/343 |
| 2019/0056478 A1* | 2/2019 | Millar | H04B 1/69 |
| 2020/0116850 A1* | 4/2020 | Santra | G01S 13/72 |
| 2020/0132811 A1* | 4/2020 | Goswami | G01S 7/352 |
| 2020/0300965 A1* | 9/2020 | Wu | G01S 13/584 |
| 2020/0408878 A1* | 12/2020 | Liang | G01S 7/354 |

OTHER PUBLICATIONS

Extended European Search Report, European Patent Application 20777101.5, dated Apr. 28, 2022, 9 pages.

* cited by examiner

RADAR SYSTEM

BACKGROUND

Various examples of frequency-modulated continuous-wave (FMCW) radar systems may be embedded in multiple usage applications, such as industrial applications, automotive applications, and the like. For example, an embedded FMCW radar system may be included in a vehicle to provide data for use in adaptive cruise control, collision warning, blind spot assist/warning, lane change assist, parking assist, etc. In other examples, embedded FMCW radar systems in industrial applications may provide data to aid in navigating autonomous equipment in a factory, tracking movement, etc.

SUMMARY

Aspects of the present disclosure provide for a radar system. In one example, the radar system includes a radar transceiver integrated circuit (IC). The radar transceiver IC includes a timing engine, a local oscillator coupled to the timing engine, and a modulator coupled to the local oscillator. The timing engine is configured to generate one or more chirp control signals. The local oscillator is configured to receive the one or more chirp control signals and generate a frame including a first sequence of chirps according to the one or more chirp control signals. The modulator is configured to modulate the first sequence of chirps to generate a second sequence of chirps such that the frame includes the first sequence of chirps and the second sequence of chirps offset by a first frequency value.

Other aspects of the present disclosure provide for a method for determining an approximate velocity in a radar system. In one example, the method includes initiating transmission, via a transmission channel, of a frame of chirps having a first sequence of chirps and a second sequence of chirps offset from the first sequence of chirps by a frequency ($\Delta f$). The method further includes receiving, via a receive channel, a frame of reflected chirps, the reflected chirps comprising the first sequence of chirps and the second sequence of chirps reflected by an object within a field of view of the radar system. The method further includes generating, via the receive channel, a digital intermediate frequency (IF) signal corresponding to the frame of reflected chirps. The method further include demodulating, via a processor, the digital IF signal to form a first demodulated IF signal corresponding to the first sequence of chirps and a second demodulated IF signal corresponding to the second sequence of chirps and determining, via the processor, the approximate velocity at least partially according to the first demodulated IF signal and the second demodulated IF signal.

Other aspects of the present disclosure provide for a method for determining a velocity in a radar system. In one example, the method includes computing, via a processing element, a first velocity estimate based on at least one range-Doppler array obtained based on transmitting a frame of chirps having a first sequence of chirps and a second sequence of chirps offset from the first sequence of chirps by $\Delta f$. The method further includes computing, via the processing element, a second velocity estimate based on phase differences of a first peak in the at least one range-Doppler array and at least a second range-Doppler array, where the at least second range-Doppler array is obtained based on transmitting the frame of chirps having the first sequence of chirps and the second sequence of chirps offset from the first sequence of chirps by the $\Delta f$. The method further includes computing, via the processing element, the velocity based on the first velocity estimate and the second velocity estimate.

BRIEF DESCRIPTION OF THE DRAWINGS

For a detailed description of various examples, reference will now be made to the accompanying drawings in which.

DETAILED DESCRIPTION

Figure 1:
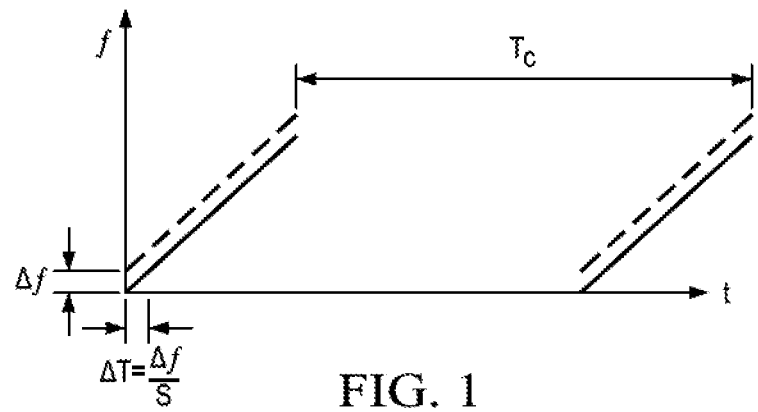
FIG. 1 shows a waveform of illustrative chirp transmission.

At least some examples of frequency modulated continuous wave (FMCW) radar systems transmit a frame containing a series of frequency ramps referred to as chirps. These chirps may be reflected by a subject object back to the FMCW radar system. After receipt of a signal containing the reflected chirps, the FMCW radar system may down-convert, digitize, and process the received signal to determine characteristics of the subject object. These characteristics can include range, velocity, angle of arrival, etc., of the subject object when the subject object is in view of the FMCW radar system. At least some examples of the FMCW radar system are capable of accurately estimating velocity of the subject object up to a maximum unambiguous velocity. For subject objects having a velocity greater than the maximum unambiguous velocity, the velocity of the subject object as measured by the FMCW radar system may be inaccurate in one, or both, of the velocity magnitude and/or sign.

In at least some FMCW radar systems, multiple sequences of chirps (e.g., such as consecutive sequences of equally spaced chirps) are transmitted and reflections of these chirps received to generate radar signals. After each sequence of chirps, there may be some idle time (e.g., inter-frame idle time) to allow for processing the radar signals resulting from the reflected chirps. The acquisition time of a sequence of chirps and the subsequent inter-frame idle time together may form a radar frame. In at least one example, the reflected signal received by each antenna of the FMCW radar system is mixed with the transmitted signal to generate an intermediate frequency (IF) signal that is filtered and digitized. Signal processing may then be performed on the resulting digital IF signals (e.g., one per receiving antenna in the FMCW radar system) to extract any one or more of the range, velocity, and/or angle of potential objects in the view of the radar.

In at least one example, for each receive channel (e.g., receiving antenna in the FMCW radar system and/or associated processing hardware), a range fast Fourier transform (FFT) is performed on the digitized samples of each reflected chirp to convert the data from the time domain to the frequency domain. At least some peak values in the resulting frequency domain array correspond to ranges (distances) of potential objects. In some examples, the results of the range FFTs are saved in memory, for example, for further processing. In some examples, the FMCW radar system may generate one set of range FFT results (e.g., one range array (or range matrix)) for each receive antenna in the FMCW radar system. In at least one example, if there are N time samples in a chirp, N range results each corresponding to a specific range bin are stored for the chirp. Similarly, if there are M chirps in the chirp sequence, arrays of M×N range values are generated by the range FFTs in which the N columns are the signal values for the corresponding range bins across the M chirps.

In at least one example, for each range array a Doppler FFT is performed over each of the corresponding range values of the chirps in the chirp sequence. For example, a Doppler FFT is performed on each of the N columns of the M×N array. At least some peak values in the resulting M×N range-Doppler plane, which may also be referred to as a range-Doppler array or range-Doppler slice, correspond to the range and relative speed (e.g., velocity) of potential objects in the view of the radar. In at least one example, the FMCW radar system generates one range-Doppler array for each receive antenna of the FMCW radar system.

In at least some examples, the FMCW radar system subsequently processes the range-Doppler arrays to determine information of at least some of the potential objects in the view of the radar. When multiple receivers each connected to a receive antenna are used, the reflected signals may each have a different delay depending on an angle of an object reflecting the signal. In at least one example, potential objects in the view of the radar are detected by considering peaks in the range-Doppler-array. The information regarding the potential objects may then be used for application specific processing such as object tracking, rate of movement of objects, direction of movement, etc. In the automotive context, the object data may be used, for example, for any one or more of lane change assistance, parking assistance, blind spot detection, rear collision alert, emergency braking, and/or cruise control.

In at least one example, the FMCW radar system estimates velocity of the potential objects in the view of the radar by measuring the phase difference across consecutive received chirps. In some examples, a large chirp periodicity ($T_c$) (e.g., the elapsed time from the start of one chirp to the start of the next chirp in the sequence of chirps) can result in a phase rollover which causes errors in the estimated velocity. In at least one example, the maximum unambiguous velocity ($v_{max}$) achievable by the FMCW radar system is inversely proportional to $T_c$. In at least one example, $$v_{max} = \frac{\lambda}{4T_c},$$

where $\lambda$ is a wavelength corresponding to the starting frequency of a chirp. However, various factors may limit the minimum achievable $T_c$, and thus limit the achievable $v_{max}$. For example, such factors can include the bandwidth spanned by a chirp, the slope of the chirp, and, in some FMCW radar systems, multiple transmitters transmitting in sequence.

In some examples, the bandwidth of a chirp affects range resolution (e.g., the larger the bandwidth of the chirp, the better the range resolution). However, increasing the chirp bandwidth to improve range resolution similarly increases $T_c$ and decreases $v_{max}$. Additionally, a maximum slope of a chirp may be limited by the bandwidth of the chirp generation circuitry, the IF bandwidth of the receive channels, and the maximum distance supported by the radar. As chirp slope decreases, $T_c$ increases for a given bandwidth spanned by the chirp and decreases $v_{max}$. In examples of the FMCW radar system that provide a time division multiplexed multiple input multiple output (TDM-MIMO) mode of operation (e.g., which may improve angle resolution), multiple transmitters transmit in sequence which may increase the effective $T_c$ and decreases $v_{max}$. In the context of TDM-MIMO, $T_c$ is defined as the elapsed time from the start of one chirp to the start of the next chirp from the same transmitter. As such, difficulties arise in increasing $v_{max}$ within the limitations present in FMCW radar systems and imposed by the minimum achievable $T_c$.

At least some aspects of the present disclosure provide for increasing $v_{max}$ of a radar system such as a FMCW radar system. In at least some examples, the FMCW radar system implements a radar transceiver integrated circuit (IC) that is configured to couple to one or more antennas (e.g., transmit and/or receive antennas) to transmit chirps and receive reflected chirps. For example, the radar transceiver IC generates a frame of equally spaced chirps and provides that frame of chirps to at least one transmit antenna for transmission. In at least some examples, prior to providing the frame of chirps to the transmit antenna, the radar transceiver IC modulates the chirps in the frame to transform the single sequence of chirps into two sequences of chirps separated by a frequency Δf. In at least some examples, Δf is comparatively small in view of the bandwidth of the radar transceiver IC. For example, Δf in some implementations is approximately 0.01 gigahertz (Ghz), such as in a system in which a first chirp spans a frequency range of 79.1 Ghz to 80.1 Ghz and a second chirp, separated by Δf from the first chirp, spanning a frequency range of 79.11 Ghz to 80.11 Ghz. In other examples, Δf takes any suitable value. As illustrated in FIG. 1, a first of the chirps in a first sequence may begin at a time t and a frequency α, where the horizontal axis represents time and the vertical access represents frequency. A first of the chirps in the second sequence may begin at the same time t and a frequency α+Δf. Similarly, a second of the chirps in a first sequence may begin at a time t+$T_c$ and the frequency α. A second of the chirps in the second sequence may begin at the same time t+$T_c$ and the frequency α+Δf. In this way, in at least some examples, corresponding chirps (e.g., a same chirp of the first and the second sequence) are separated in frequency at any given time t by the frequency Δf and are separated in time at any given frequency f by the time ΔT, where $$\Delta T = \frac{\Delta f}{s}$$

and S is the slope of the chirp.

Although illustrated as having a frame including only two sequences of two chirps offset by Δf, the FMCW radar system of the present disclosure may be adapted to have a frame including more than two sequences of chirps and/or sequences each including more than two chirps, where each sequence of chirps is offset by some frequency and such examples are included within the scope of the present disclosure. To at least partially compensate, in one example, for the limitations imposed by the minimum achievable $T_c$, chirps in the frame are modulated to facilitate a $v_{max}$ of the disclosed FMCW radar system of approximately $$v_{max} = \frac{\lambda}{4T_c}.$$

In at least one example, reducing the time separation of a sequence of chirps and its corresponding sequence of modulated chirps in the frame increases the $v_{max}$ of the FMCW radar system while utilizing a single radar transceiver IC. In one example in which $\Delta T$ is much less than $T_c$, $v_{max}$ of the FMCW radar system is increased by a factor given by approximately the order of $$\frac{T_C}{\Delta T}.$$

In one example, a value of the magnitude of $\Delta f$ may be chosen such that a corresponding $\Delta T$ is greater than a maximum round trip delay from the FMCW radar system to the farthest objects and back to the FMCW radar system. In one example, this provides for reflections corresponding to the first sequence of chirps not overlapping in the frequency domain with reflections corresponding to the second sequence of chirps. In one example, this staggering of reflections further enables the reflections to be separated and digital processing to be performed on the reflections. In examples in which a third sequence of chirps also exists, the time differences between any pair of chirp sequences is greater than the round trip delay, discussed above. In one example, the farthest object refers to an object (if existing) capable of creating a reflected signal received at the FMCW radar system of significant strength that the reflected signal is capable of either corrupting detection by the FMCW radar system of signals corresponding to the other sequences of chirps or capable of being corrupted by the presence of such other reflection signals from the multiple sequences of chirps. If the farthest object corresponds to a round trip delay of $T_{farthest}$, then $F_{farthest} = S*T_{farthest}$ may be an estimated maximum IF frequency of the FMCW radar system.

Figure 2:
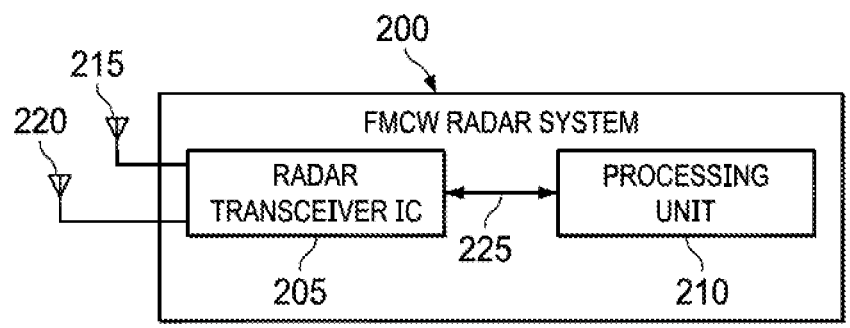
FIG. 2 shows a block diagram of an illustrative frequency modulated continuous wave (FMCW) radar system.
Figure 3:
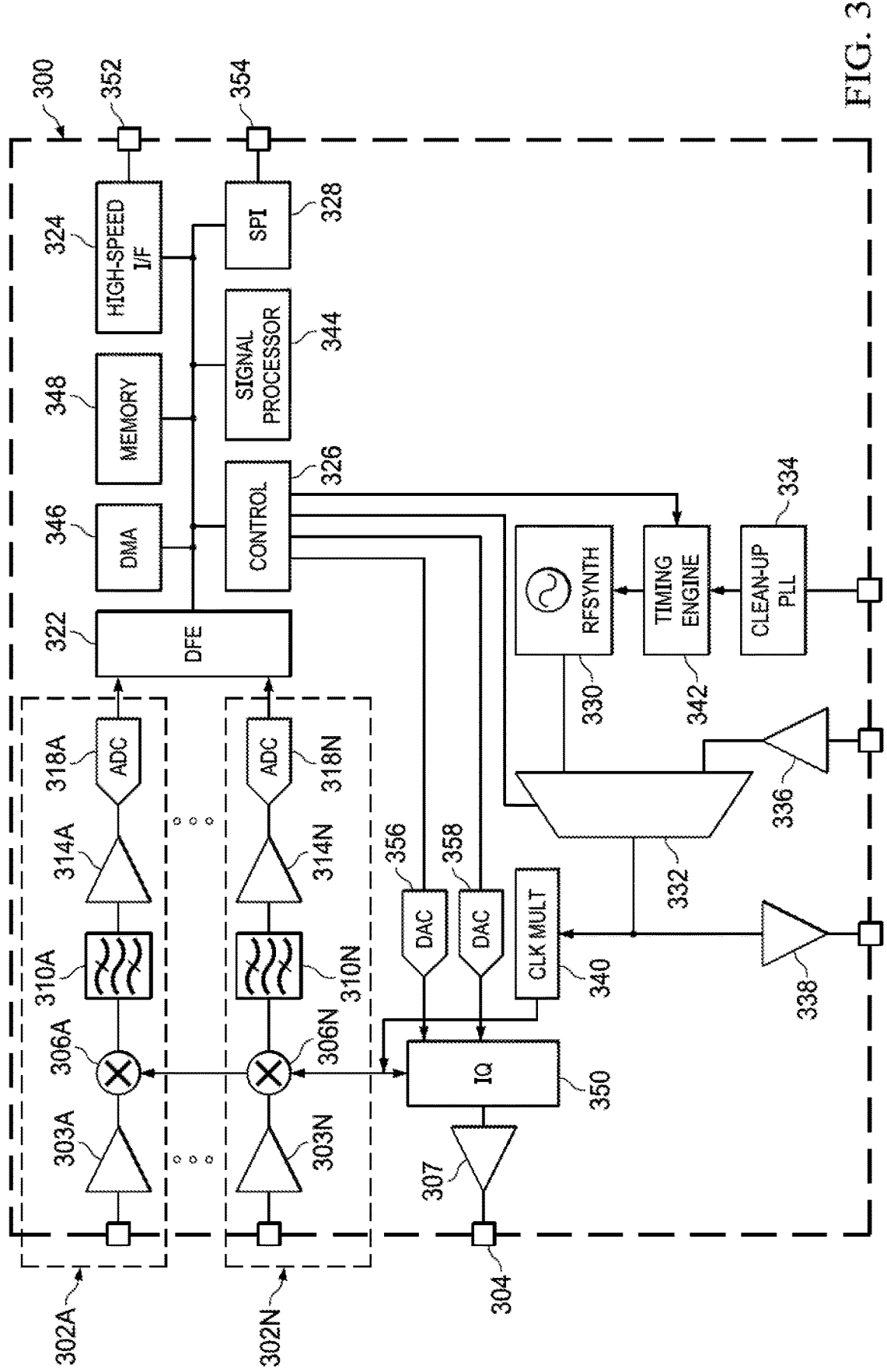
FIG. 3 shows a block diagram of an illustrative radar transceiver integrated circuit (IC)

Referring now to FIG. 2, a block diagram of an illustrative FMCW radar system 200 is shown. In at least one example, the FMCW radar system 200 includes a radar transceiver IC 205 and a processing unit 210. In some examples, the FMCW radar system 200 further includes a transmit antenna 215 and a receive antenna 220, while in other examples the FMCW radar system 200 does not include, but is configured to couple to, the transmit antenna 215 and the receive antenna 220. An illustrative architecture of the radar transceiver IC 205 is illustrated in FIG. 3 and described below.

In at least one example, the radar transceiver IC 205 may be referred to as the front end of the FMCW radar system 200 and the processing unit 210 may be referred to as the backend of the FMCW radar system 200. In at least one example, the radar transceiver IC 205 and the processing unit 210 are implemented separately and may be configured to couple together, while in other examples the radar transceiver IC 205 and the processing unit 210 are implemented together, for example, in a single chip package or on a system-on-chip (SoC) (e.g., a single integrated circuit). In examples where radar transceiver IC 205 and processing unit 210 are implemented on a SoC, the radar transceiver IC 205 may correspond to a sub-circuit of the IC that forms the SoC. In at least one example, the processing unit 210 is coupled to the radar transceiver IC 205 via an interface 225 that may facilitate any suitable communication method (e.g., serial interface or parallel interface) and is configured to receive data from and/or transmit data to the radar transceiver IC 205.

In at least one example, the interface 225 may be a high speed serial interface such as a low-voltage differential signaling (LVDS) interface. In another example, the interface 225 may be lower speed interface such as a serial peripheral interface (SPI). In at least one example, the radar transceiver IC 205 includes functionality to generate one or more digital IF signals (alternatively referred to as de-chirped signals, beat signals, or raw radar signals) from reflected chirps received via the receive antenna 220. Further, in at least one example, the radar transceiver IC 205 includes functionality to perform at least a portion of the signal processing of radar signals (e.g., the reflected chirps and/or the digital IF signals) received in the radar transceiver IC 205, and to provide the results of this signal processing to the processing unit 210 via the interface 225. In at least one example, the radar transceiver IC 205 performs a range FFT for each received frame (e.g., each sequence of chirps of the frame) of the radar transceiver IC 205. In at least some examples, the radar transceiver IC 205 also performs a Doppler FFT for each received frame of the radar transceiver IC 205 (e.g., after performing, and on a result of, the range FFTs).

In at least one example, the processing unit 210 includes functionality to process data received from the radar transceiver IC 205 to, for example, determine any one or more of a distance, velocity, and/or angle of any objects detected by the FMCW radar system 200. In some examples, the processing unit 210 may also, or alternatively, include functionality to perform post processing of information about the detected objects, such as tracking objects, determining rate and direction of movement, etc. In at least one example, the processing unit 210 determines a velocity of a detected object, for example, according to aspects of the present disclosure providing for an increased $v_{max}$ of the FMCW radar system 200. In various examples, the processing unit 210 includes any one or more suitable processors or combinations of processors as needed for processing data received from the radar transceiver IC 205 and or providing data to the radar transceiver IC 205. For example, the processing unit 210 may include any one or more of a digital signal processor (DSP), a microcontroller, a system-on-a-chip (SOC) combining both DSP and microcontroller processing, a field-programmable gate array (FPGA), or any combination of the foregoing.

Referring now to FIG. 3, a block diagram of an illustrative radar transceiver IC 300 is shown. In at least some examples, the radar transceiver IC 300 is suitable for implementation as the radar transceiver IC 205 of the FMCW radar system 200 of FIG. 2. In other examples, the radar transceiver IC 300 is suitable for implementation in other radar systems. In at least one example, the radar transceiver IC includes one or more transmit channels 304 and one or more receive channels 302A-302N (where N is any positive integer). Each of the transmit channels 304 and the receive channels 302A-302N may be individually coupled to a transmit antenna or a receive antenna, respectively, such as a transmit antenna 215 or a receive antenna 220, as discussed above with respect to FIG. 2 and not shown in FIG. 3. Although illustrated for the sake of simplicity as including two receive channels 302A and 302N and one transmit channel 304, in various examples the radar transceiver IC 300 may include any suitable number of receive channels 302N and/or any suitable number of transmit channels 304. Additionally, the number of receive channels 302N and the number of transmit channels 304 may be different numbers.

In at least one example, a transmit channel 304 includes a power amplifier (PA) 307 coupled between a transmit antenna (not shown) and an I/Q modulator 350 to amplify an output of the I/Q modulator 350 for transmission via the first transmit antenna. In at least some examples, each additional transmit channel 304 may be substantially similar and may couple to its own respective transmit antenna (not shown) or to the same transmit antenna.

In at least one example, a first receive channel 302A includes a low-noise amplifier (LNA) 303A coupled between a receive antenna (not shown) and a mixer 306A to amplify a radio frequency (RF) signal (e.g., reflected chirps) received via the receive antenna prior to providing the amplified signal to the mixer 306A. In at least one example, the mixer 306A is coupled to the clock multiplier 340 and configured to receive a clock signal from the clock multiplier 340, for example, to mix with the received RF signal to generate an IF signal. In at least one example, a baseband bandpass filter 310A is coupled to the mixer 306A and configured to filter the IF signal, a variable gain amplifier (VGA) 314A is coupled to the baseband bandpass filter 310A and configured to amplify the filtered IF signal, and an analog-to-digital converter (ADC) 318A is coupled to the VGA 314A and configured to convert the analog IF signal to a digital IF signal. The baseband bandpass filter 310A, VGA 314A, and ADC 318A of a respective receive channel 302A may be collectively referred to as the analog baseband, the baseband chain, the complex baseband, or the baseband filter chain. Further, the baseband bandpass filter 310A and VGA 314A may be collectively referred to as an IF amplifier (IFA). In at least some examples, each additional receive channel 302N may be substantially similar to the first receive channel 302A and may couple to its own respective receive antenna (not shown) or to the same receive antenna. For example, each receive channel 302N may include an LNA 303N, mixer 206N, baseband bandpass filter 310N, VGA 314N and ADC 318N. In at least one example, the ADC 318A is coupled to the digital front end (DFE) 322, for example, to provide the digital IF signals to the DFE 322. The DFE 322, which may also be referred to as the digital baseband, includes in at least one example, functionality to perform decimation filtering or other processing operations on the digital IF signals, for example, to reduce the data transfer rate of the digital IF signals. In various examples, the DFE 322 may also perform other operations on the digital IF signals such as direct current (DC) offset removal and/or compensation (e.g., digital compensation) of non-idealities in the receive channels 302A-302N such as inter-receiver gain imbalance non-ideality, inter-receiver phase imbalance non-ideality and the like. In at least one example, the DFE 322 is coupled to a signal processor 344 and configured to provide the output of the DFE 322 to the signal processor 344.

In at least one example, the signal processor 344 is configured to perform at least a portion of the signal processing on the digital IF signals resulting from a received radar frame and to transmit the results of this signal processing via terminal 352 and/or terminal 354. In at least one example, the signal processor 344 transmits the results of the signal processing to a processing unit (not shown), such as the processing unit 210 described above with respect to FIG. 2. In various examples, the results are provided from the signal processor 344 to the terminal 352 and/or the terminal 354 via the high speed interface 324 and/or the SPI 328, respectively. In at least one example, the signal processor 344 performs the range FFT on each sequence of chirps in the received radar frame. In at least one example, the signal processor 344 additionally performs the Doppler FFT on results of the range FFTs.

The signal processor 344 may include any suitable processor or combination of processors. For example, the signal processor 344 may be a DSP, a microcontroller, a FFT engine, a DSP plus microcontroller processor, a FPGA, or an application specific integrated circuit (ASIC). In at least one example, the signal processor 344 is coupled to memory 348, for example, to store intermediate results of the portion of the signal processing performed on the digital IF signals in the memory 348 and/or to read instructions from the memory 348 for execution by the signal processor 344.

The memory 348, in at least one example, provides on-chip storage (e.g., a non-transitory computer readable storage medium) which may be used, for example, to communicate data between the various components of the radar transceiver IC 300, to store software programs executed by processors on the radar transceiver IC 300, etc. The memory 348 may include any suitable combination of read-only memory (ROM) and/or random access memory (RAM) (e.g., such as static RAM). In at least one example, a direct memory access (DMA) component 346 is coupled to the memory 348 to perform data transfers from the memory 348 to the high speed interface 324 and/or the SPI 328.

In at least one example, the SPI 328 provides an interface for communication via terminal 354 between the radar transceiver IC 300 and another device (e.g., a processing unit such as the processing unit 210 of FIG. 2). For example, the radar transceiver IC 300 may receive control information, e.g., timing and frequencies of chirps, output power level, triggering of monitoring functions, etc., via the SPI 328. In at least one example, the radar transceiver IC 300 may transmit test data via the SPI 328, for example, to the processing unit 210.

In at least one example, the control module 326 includes functionality to control at least a portion of the operation of the radar transceiver IC 300. The control module 326 may include, for example, a microcontroller that executes firmware to control the operation of the radar transceiver IC 300. The control may be, for example, providing data parameters to other components of the radar transceiver IC 300 and/or providing control signals to other components of the radar transceiver IC 300.

In at least one example, the programmable timing engine 342 includes functionality to receive chirp parameter values from the control module 326 for a sequence of chirps in a radar frame and to generate chirp control signals that control the transmission and reception of the chirps in a frame based on the parameter values. In some examples, the chirp parameters are defined by the radar system architecture and may include, for example, a transmitter enable parameter for indicating which transmit channels to enable, a chirp frequency start value, a chirp frequency slope, an ADC sampling time, a ramp end time, a transmitter start time, etc.

In at least one example, the radio frequency synthesizer (RFSYNTH) 330 includes functionality to generate signals (e.g., chirps and/or chirp sequences) for transmission based on chirp control signals received from the programmable timing engine 342. In some examples, the RFSYNTH 330 includes a phase locked loop (PLL) with a voltage controlled oscillator (VCO). In at least one example, the RFSYNTH 330 may be referred to as a local oscillator (LO).

In at least one example, the multiplexer 332 is coupled to the RFSYNTH 330 and the input buffer 336 and is configurable to select between signals received from the input buffer 336 from an external component (not shown) and signals generated by the RFSYNTH 330. In at least one example, the output buffer 338 is coupled to the multiplexer 332 and may, for example, provide signals selected by the multiplexer 332 to the input buffer of another radar transceiver IC (not shown). In at least one example, the multiplexer is controlled by the control module 326 via a select signal.

In at least one example, the clock multiplier 340 increases a frequency of an output of the multiplexer 332 (e.g., such as the output of the RFSYNTH 330) to a frequency of operation of the mixer 306A. In at least one example, the clean-up PLL 334 is configured to increase the frequency of the signal of an external low frequency reference clock (not shown) received by the radar transceiver IC 300 to the frequency of the RFSYNTH 330 and to filter the reference clock phase noise out of the reference clock signal.

In at least one example, the I/Q modulator 350 receives the output of the clock multiplier 340 (e.g., the chirps and/or sequences of chirps) and modulates the output of the clock multiplier 340 based on data received from the control module 326 to generate a frequency-shifted replica of the output of the clock multiplier 340. In at least one example, the I/Q modulator is further coupled to a digital-to-analog converter (DAC) 356 and a DAC 358, each of which may be coupled to the control module 326. In at least one example, the DAC 356 receives a real component of $1+e^{j2\pi\Delta ft}$ from the control module 326 and the DAC 358 receives an imaginary component of $1+e^{j2\pi\Delta ft}$ from the control module 326, where t is representative of continuous (e.g., real) time in an analog signal and a given digital sample in a digital signal. Each of the DAC 356 and the DAC 358 converts their respective received signals to an analog value and provides the analog values to the I/Q modulator 350. For example, the DAC 356 may provide its analog value output to a real component input of the I/Q modulator 350 and the DAC 358 may provide its analog value output to an in-phase component input of the I/Q modulator 350.

In at least one example, the I/Q modulator 350 generates in-phase (I) and quadrature (Q) components of the clock signal received from the clock multiplier 340 and multiples the I and Q clock components by the analog values received from the DAC 356 and the DAC 358, respectively, and sums the resulting multiplied values before providing a signal to the PA 307. This multiplication, in at least some examples, modulates the output of the clock multiplier 340 to generate a resulting signal that includes a frequency-shifted replica of the output of the clock multiplier 340, for example, as illustrated and discussed above with reference to FIG. 1, in which solid lines represent the output of the clock multiplier 340 and dashed lines represent the frequency-shifted (e.g., modulated) replica of the output of the clock multiplier 340. As described above, I/Q modulator 350 may generate a complex-valued modulated signal that includes a first sequence of chirps and a second sequence of chirps, the second sequence of chirps being frequency-shifted by Δf relative to the first sequence of chirps. The complex-valued modulated signal may include an in-phase component that corresponds to the real part of the complex-valued signal and a quadrature phase component that corresponds to the imaginary part of the complex-valued signal.

The receive channel 302A is illustrated in FIG. 3 as a real receive channel. The real receive channel, in at least one example, has a bandwidth of 0 to 2Δf (e.g., a bandwidth of the baseband bandpass filter 310A, VGA 314A, and ADC 318A may be at least 0 to 2Δf). In other unshown examples, the receive channel 302A may be implemented as a complex receive channel. The complex receive channel, in at least one example, includes duplicates (not shown) of at least some of the LNA 303A, mixer 306A, baseband bandpass filter 310A, VGA 314A, and/or ADC 318A. The complex receive channel, in at least one example, has a bandwidth of −Δf to Δf. When the receive channel 302A is implemented as a complex receive channel, the mixer 306A may receive an I component of the clock signal generated by the clock multiplier 340 and the duplicate of the mixer 306A may receive a Q component of the clock signal generated by the clock multiplier 340 such that the mixer 306A and the duplicate of the mixer 306A operate at a 90 degree phase difference. In various examples, the I and Q components of the clock signal may be generated by an I/Q splitter (not shown) that receives the clock signal generated by the clock multiplier 340. The I/Q splitter, for example, generates signals having a 90 degree phase difference between them. The I/Q splitter, in some examples, is implemented as a discrete component of the radar transceiver IC 300, while in other examples is implemented as a portion of the I/Q modulator 350.

Figure 4:
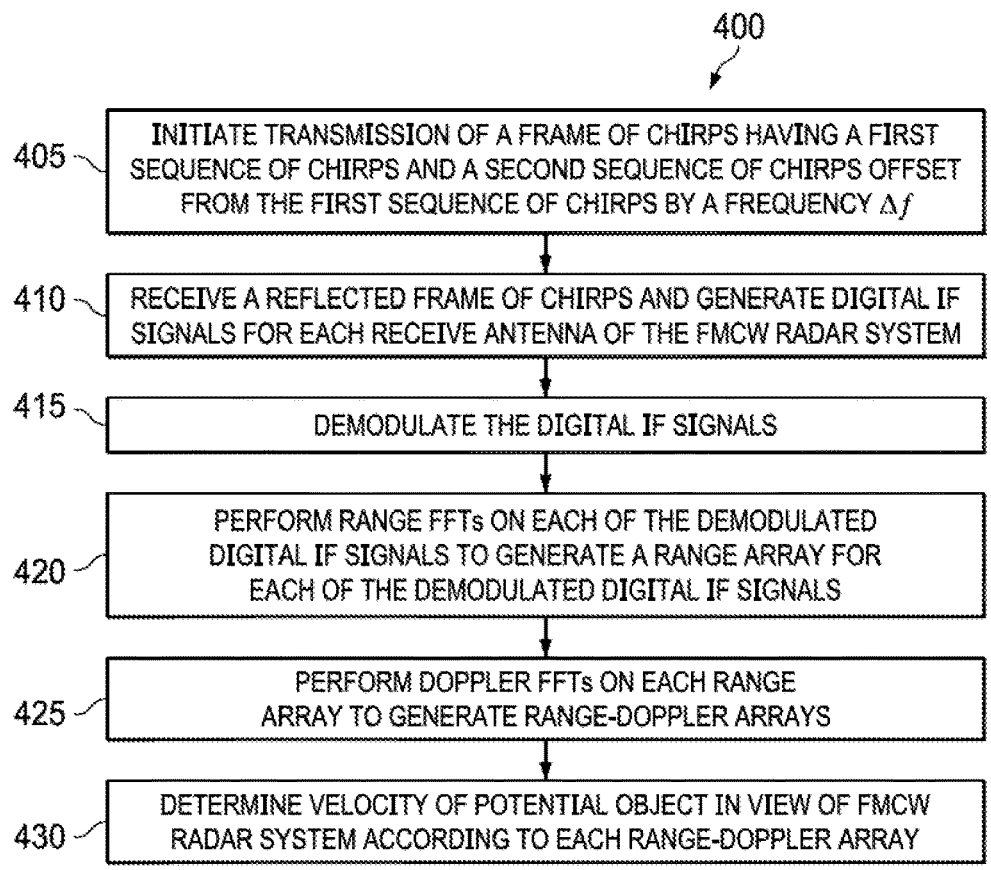
FIG. 4 shows a flowchart of an illustrative method for FMCW radar.

Referring now to FIG. 4, a flowchart of an illustrative FMCW radar method 400, which may increase $v_{max}$ is shown. In at least some examples, the method 400 is implemented by a FMCW radar system, such as the FMCW radar system 200 of FIG. 2, for example, at least partially by a radar transceiver IC, such as the radar transceiver IC 205 of FIG. 2 and/or radar transceiver IC 300 of FIG. 3.

At operation 405, the FMCW radar system initiates transmission of a frame of chirps having a first sequence of chirps and a second sequence of chirps offset from the first sequence of chirps by Δf. The process of initiating transmission of the frame of chirps is further described below with respect to FIG. 6.

At operation 410, the FMCW radar system receives a reflected frame of chirps and generates digital IF signals for each receive antenna of the FMCW radar system. In at least one example, the FMCW radar system generates the digital IF signals by combining (e.g., mixing or multiplying) the received frame of chirps with the chirps output by the clock multiplier 340, for example, using a mixer, filtering the combined signal, amplifying the filtered signal, and converting the filtered signal from an analog format to a digital format to form the digital IF signals. In some examples, the radar system may include an I/Q demodulator that demodulates the received frame of chirps with the chirps output by the clock multiplier 340 to generate an in-phase component of the digital IF signal, and further demodulates the received frame of chirps with a 90 degree phase-shifted version of the chirps output by the clock multiplier 340 to generate a quadrature component of the digital IF signal. The in-phase and quadrature phase components of the digital IF signal may together form a complex-valued digital IF signal.

At operation 415, the FMCW radar system demodulates the digital IF signals. For example, when the frame of chirps transmitted by the FMCW radar system (e.g., at operation 405) and subsequently received as a frame of reflected chirps (e.g., at operation 410) includes two sequences of chirps that are offset by Δf, the digital IF signals may similarly contain reflected chirp data corresponding to the two sequences and separated in the digital IF signals by Δf.

To access the data from both sequences of chirps, the FMCW radar system, in at least one example, demodulates the digital IF signal and/or performs a first FFT on the digital IF signal to obtain data from chirps originally belonging to the first sequence of chirps. In at least some examples, the FMCW radar system may further demodulate the digital IF signal by $\Delta f$ (or perform equivalent FFT processing) to compensate for the frequency offset of $\Delta f$ to obtain data from chirps originally belonging to the second sequence of chirps that were offset from the first sequence of chirps by $\Delta f$. In at least one example, the FFTs and/or demodulation are performed in a signal processor of the radar transceiver IC of the FMCW radar system. In another example, the digital IF signals are communicated to the processing unit of the FMCW radar system, which performs the FFTs and/or demodulation. In one example, the demodulation and FFTs are implemented as separate subsets of the operation 415, while in other examples the demodulation includes the performance of one or more FFTs and/or processing of one or more FFT bins.

In one example, the digital IF signal contains the summation of signals corresponding to reflections from objects corresponding to both the first and second sequences of chirps. In the digital IF signal, the signals corresponding to the first and second sequences of chirps are offset by a frequency of $\Delta f$. Optionally, a new version of the digital IF signal corresponding to the second sequence of chirps may be created through digital processing (e.g., multiplying the time domain digital data by $e^{-j2\pi\Delta ft}$ (sometimes referred to as frequency shifting)). In that new version of the digital IF signal, the signal corresponding to the second sequence of chirps occupies the same frequency range as that corresponding to the first sequence of chirps in the original version of the digital IF signal. To enable further digital processing (e.g., such as performing a range dimension FFT), the new version of the digital IF signal may be passed through a digital filter to suppress frequency components beyond a frequency of interest (e.g. 0 to $F_{farthest}$). The new version of the digital IF signal created at the digital filter's output may be called the demodulated digital IF signal corresponding to the second sequence of chirps. The original digital IF signal itself may be (e.g., without any frequency shifting) passed through a similar digital filter to suppress frequency components beyond the actual frequency of interest and referred to as the demodulated version of the first sequence of chirps (or referred to as the demodulated digital IF signal corresponding to the first sequence of chirps). Any third sequence of chirps, if present, may go through processing similar to the second sequence of chirps, with the exception that $\Delta f$ is replaced by a corresponding frequency difference between the first sequence of chirps and the third sequence of chirps. In some examples, the demodulated digital IF signal to the second (and/or subsequent) sequence of chirps is sampled with a delay of $\Delta T$ (or an integer multiple of $\Delta T$) compared to sampling of the demodulated digital IF signal corresponding to the first sequence of chirps. In some examples, this delay in sampling provides for the demodulated digital IF signals of the first, second, and any subsequent sequence of chirps to correspond to substantially the same starting RF frequency. The demodulated digital RF signals discussed herein are sampled according to this delay.

At operation 420, the FMCW radar system performs range FFTs on each of the demodulated digital IF signals to generate a range array for each of the demodulated digital IF signals. For example, the radar system may perform a first range FFT for a first demodulated digital IF signal and a second range FFT for a second demodulated digital IF signal where the second demodulated digital signal is a frequency-shifted version of the first digital demodulated signal. Each range FFT operation may generate a M×N range array (or range matrix), where M is the number of chirps in the chirp sequence and N is the number of time samples for receiving a chirp. N may also correspond to the number of range bins in the range array. In some examples, a range FFT operation may be performed for each sequence of chirps received by each of the receive antennas of the FMCW radar system. In at least one example, respective range FFTs are performed in a signal processor of the radar transceiver IC of the FMCW radar system and the resulting range arrays are communicated to a processing unit of the FMCW radar system. In another example, the demodulated digital IF signals are communicated to the processing unit of the FMCW radar system, which performs the range FFTs.

In another example, the digital IF signal may be used to perform range FFTs directly without performing demodulation as discussed above. In such an example, a length of the FFT may be doubled (e.g., to hold information corresponding to both first and second sequences of chirps). In such a case, the range FFT bins corresponding to frequencies from, for example, 0 to $F_{farthest}$ will contain the range FFT values corresponding to the first sequence of chirps. In the same case, the range FFT bins corresponding to frequencies from, for example, $\Delta f$ to $\Delta f+F_{farthest}$ will contain the range FFT values corresponding to the second sequence of chirps. Any third sequence will similarly correspond to $2\Delta f$ to $2\Delta f+F_{farthest}$ (e.g. such that the range FFTs will have to be thrice longer to hold information corresponding to the first, second, and third sequences of chirps).

At operation 425, the FMCW radar system performs Doppler FFTs on each of the range arrays generated at operation 420 to generate corresponding range-Doppler arrays (or range-Doppler matrices). For example, a Doppler FFT is performed on each of the N columns of each range array generated at operation 420. In some examples, operation 425 may generate a first range-Doppler array corresponding to the first sequence of chirps, and a second range-Doppler array corresponding to the second sequence of chirps.

Figure 5:
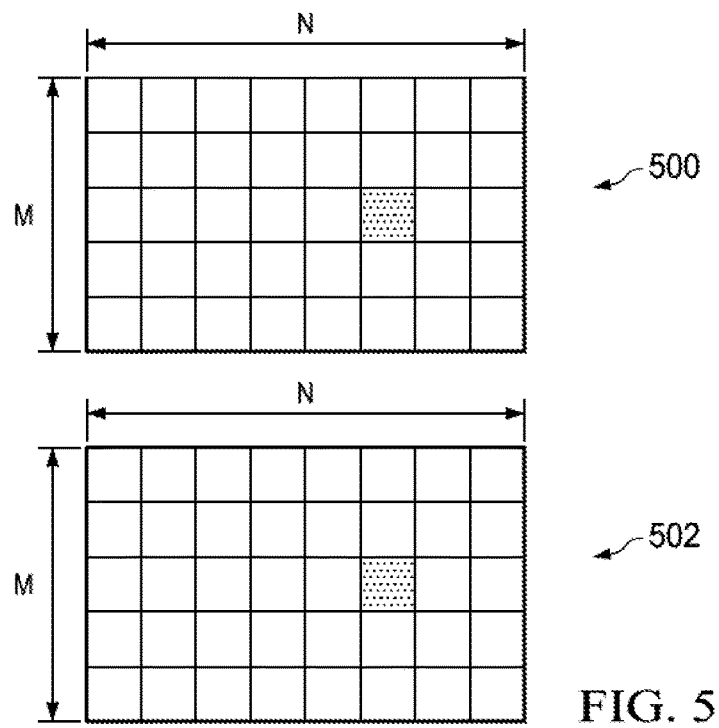
FIG. 5 shows a diagram of illustrative range-Doppler arrays.

At operation 430, the FMCW radar system determines a velocity of a potential object in view of the FMCW radar system according to each range-Doppler array. In at least one example, peaks in the range-Doppler arrays indicate potential objects and the velocity of these potential objects is determined from the locations of respective peaks in the range-Doppler array. An example of the range-Doppler arrays is shown in FIG. 5. In this example, a M×N array 500 represents a range-Doppler array corresponding to a first sequence of chirps from a received radar frame and a M×N array 502 represents a range-Doppler array corresponding to a second sequence of chirps from the received radar frame. In at least some examples, a shaded box of the array 500 and the array 502 indicates a peak in the respective arrays that corresponds to a potential object in view of the FMCW radar system. In at least one example, the row and column number of the peak in the range-Doppler arrays respectively correspond to the velocity and the range of a potential object in view of the FMCW radar system. In at least one example, the velocity of the potential object is further refined by finding a difference between phases of peaks in the range-Doppler arrays, for example, as described below with reference to FIG. 7. In an example in which longer FFTs (e.g., 2N point FFTs) were performed in place of performing demodulation, the array 500 may be created by extracting bins corresponding to the first half of the longer FFT (e.g., 0 to N−1) and the array 502 may be created by extracting bins corresponding to the second half of the longer FFT (e.g., N to 2N−1). To delay sampling of the demodulated digital IF signal corresponding to the second sequence of chirps (and subsequent sequences of chirps) by ΔT (or an integer multiple of ΔT), in one example a phase of the values in each range bin of the array 502 are modified by adding 2*π*IF *ΔT, where IF is the frequency value corresponding to the range bin given by $$Fs * \frac{n}{N},$$

Fs is the sampling rate, N is the number of samples per chirp, and n is the range bin index from 0 to N−1.

In one example, the maximum unambiguous velocity of the potential object in view of the FMCW radar system when determined only according to the row number of the range-Doppler array(s) may be V1 and the FMCW radar system will estimate the velocity between $$-\frac{V1}{2} \text{ and } \frac{V1}{2}$$

If an object exists in view of the FMCW radar system with a velocity of p*V1+v, where p is an integer (positive or negative) and v is from $$-\frac{V1}{2} \text{ to } \frac{V1}{2},$$

the FMCW radar system may determine the velocity of the object erroneously as v based on the row number of the range-Doppler array(s) when p is nonzero. The FMCW radar system subsequently determines an approximation of the actual velocity of the object (such as via Equation 3, discussed below). The FMCW radar system further refines the calculation of the velocity of the object according to the difference between phases of peaks in the range-Doppler arrays by determining the velocity of the object for a value of p nearest to the approximation of the actual velocity of the object.

Figure 6:
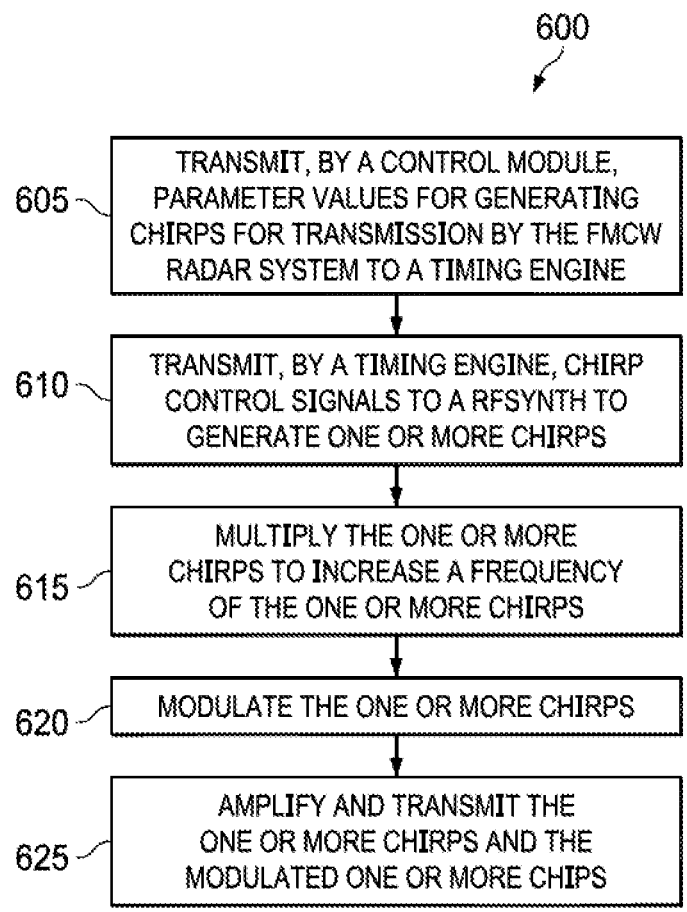
FIG. 6 shows a flowchart of an illustrative method for initiating transmission of a frame of chirps.

Referring now to FIG. 6, a flowchart of an illustrative method 600 for initiating transmission of a frame of chirps is shown. In at least some examples, the method 600 is implemented by a FMCW radar system, such as the FMCW radar system 200 of FIG. 2, for example, at least partially by a radar transceiver IC, such as the radar transceiver IC 205 of FIG. 2 and/or radar transceiver IC 300 of FIG. 3.

At operation 605, a control module of the FMCW radar system (or alternatively, a component external to the radar transceiver IC and/or the FMCW radar system) transmits parameter values for generating chirps for transmission by the FMCW radar system to a timing engine. In some examples, the timing engine generates chirp control signals that control the transmission and/or reception of the chirps by the FMCW radar system in a frame based on the parameter values. In some examples, the chirp parameters are defined by the radar system architecture and may include, for example, a transmitter enable parameter for indicating which transmit channels to enable, a chirp frequency start value, a chirp frequency slope, an ADC sampling time, a ramp end time, a transmitter start time, etc.

At operation 610, the timing engine transmits chirp control signals to a RFSYNTH to generate one or more chirps. In at least some examples, the RFSYNTH may be a local oscillator of the FMCW radar system. At operation 615, the one or more chirps are multiplied to increase a frequency of the one or more chirps to generate amplified chips (or multiplied chirps or modified chirps), for example, to match a frequency of operation of receiving components of the FMCW radar system.

At operation 620, the amplified chirps are modulated. Modulating the amplified chirps, in at least one example, generates a frequency-shifted replica of the amplified chirps offset by a frequency Δf. In at least one example, the modulation is performed by an I/Q modulator. In at least one embodiment, the I/Q modulator receives a real component of a signal $1+e^{j2\pi\Delta ft}$ and an imaginary component of the signal $1+e^{j2\pi\Delta ft}$ for use in modulating the amplified chirps. At operation 625, the modulated chirps are amplified and transmitted via one or more antennas.

Figure 7:
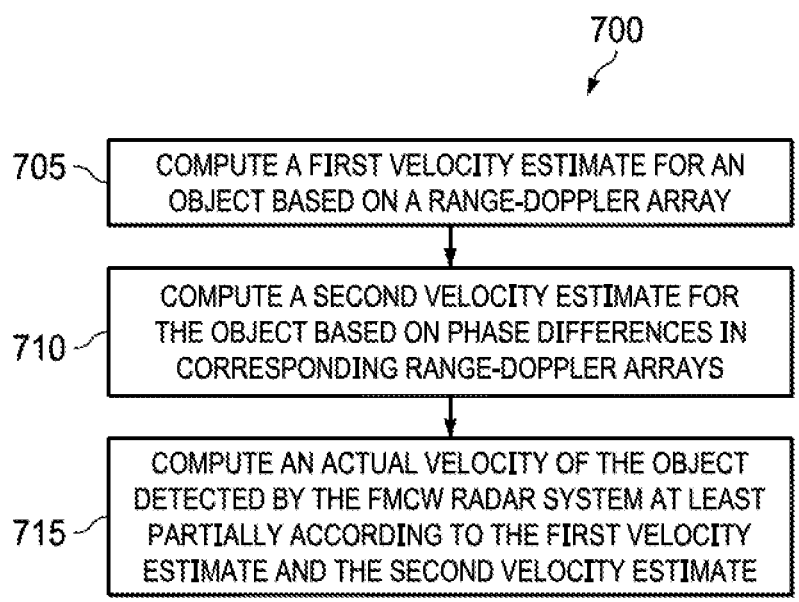
FIG. 7 shows a flowchart of an illustrative method for determining a velocity of an object detected by a FMCW radar system.

Referring now to FIG. 7, a flowchart of an illustrative method 700 for determining a velocity of an object detected by a FMCW radar system is shown. In at least some examples, the method 700 is implemented by a FMCW radar system, such as the FMCW radar system 200 of FIG. 2, for example, at least partially by a radar transceiver IC, such as the radar transceiver IC 205 of FIG. 2 and/or radar transceiver IC 300 of FIG. 3.

At operation 705, the FMCW radar system computes a first velocity estimate ($v_{est1}$) for a potential object in view of the FMCW radar system based on a range-Doppler array. In one example, the range-Doppler array is one of a first range-Doppler array corresponding to a first sequence of chirps of a received radar frame or a second range-Doppler array corresponding to a second sequence of chirps of the received radar frame. In another example, the range-Doppler array is an average or other relationship between, or combination of, the first range-Doppler array corresponding to the first sequence of chirps of the received radar frame and the second range-Doppler array corresponding to a second sequence of chirps of the received radar frame. For example, the FMCW radar system computes $v_{est1}$ according to method 400, as discussed above, which may be determined based on the location of the peak in the range-Doppler arrays corresponding to the potential object. As discussed above, the row number of a peak in the range-Doppler arrays corresponds to the velocity of the potential object. In at least one example, $v_{est1}$ may be aliased (e.g., there may be phase rollover such that an error in $v_{est1}$ is an integer multiple of the maximum measurable velocity ($v_{max}$)).

In at least one example, the relative motion of an object with respect to the FMCW radar system introduces a phase change $\phi_d$ across subsequent chirps in a received frame of reflected chirps, where the phase change is defined as:

$$\phi_d = \frac{4\pi v T_c}{\lambda}, \quad (1)$$

where v is the velocity of the object, $T_c$ is the chirp periodicity, and λ is the wavelength corresponding to the starting frequency of a chirp. Because there is a linear progression in the phase across chirps in a frame, the phase change $\phi_d$ can be estimated using a FFT. Once the phase change $\phi_d$ is estimated, in one example the velocity estimate $v_{est1}$ can be estimated by inverting equation 1 to obtain $v_{est1}$ given as:

$$v_{est1} = \frac{\lambda \phi_d}{4\pi T_c}. \tag{2}$$

In another example, $v_{est}$ is estimated by performing the Doppler FFT as discussed above and finding the location of the peak corresponding to the object of interest in the resulting range-Doppler array. When $$v_{maxorig} = \frac{\lambda}{4T_c},$$

and if the object's velocity exceeds +/−0.5*$v_{maxorig}$, $v_{est1}$ may have an error which is approximately an integer multiple of $v_{maxorig}$. The $v_{maxorig}$ is the unambiguously detectable velocity when using only the first sequence of the chirps (or only the second sequence of chirps) without using the $v_{est2}$, as discussed in greater detail below.

At operation 710, the FMCW radar system computes a second velocity estimate ($v_{est2}$) for the object based on phase differences in corresponding range-Doppler arrays (e.g., a range-Doppler array corresponding to the first sequence of chirps and a range-Doppler array corresponding to the second sequence of chirps offset from the first sequence of chirps by Δf). The range-Doppler arrays are generated, in at least one example, at least partially according to method 400, as discussed above. Once the phase difference is determined (e.g., by subtracting the phase of the peak of one range-Doppler array from the phase of the peak of the second range-Doppler array), the velocity estimate $v_{est2}$ can be estimated according to:

$$v_{est2} = \frac{\Delta\phi K}{\pi} v_{maxorig}, \tag{3}$$

where Δϕ is the phase difference (or an average of multiple phase differences) of peaks in the range-Doppler arrays (e.g., to account for FMCW radar systems having a plurality of transmit and/or receive antennas), $$K = \frac{T_c}{\Delta T}, \quad v_{maxorig} = \frac{\lambda}{4T_c}$$

and λ is the wavelength of transmission of the FMCW radar system at the time that transmission is initiated (e.g., at operation 405 of method 400, discussed above with reference to FIG. 4).

At operation 715, the FMCW radar system computes an actual, or true, velocity ($v_{true}$) of the object detected by the FMCW radar system at least partially according to $v_{est1}$ and $v_{est2}$. For example, the FMCW radar system may determine $v_{true}$ according to:

$$v_{true} = v_{est1} + 2nv_{maxorig}, \tag{4}$$

where n is an integer that estimates the ambiguity in the velocity calculation and is defined as n=($v_{est2}$−$v_{est1}$)/ $2v_{maxorig}$. In at least some examples, the calculated value of n may be rounded to the nearest integer prior to use in equation 4 to determine the actual velocity of the object. In another example, various negative and positive (including 0) integer multiples of $v_{maxorig}$ may be added to $v_{est1}$, to form various sums, with a sum that is numerically closest to $v_{est2}$ being selected as $v_{true}$.

Figure 8:
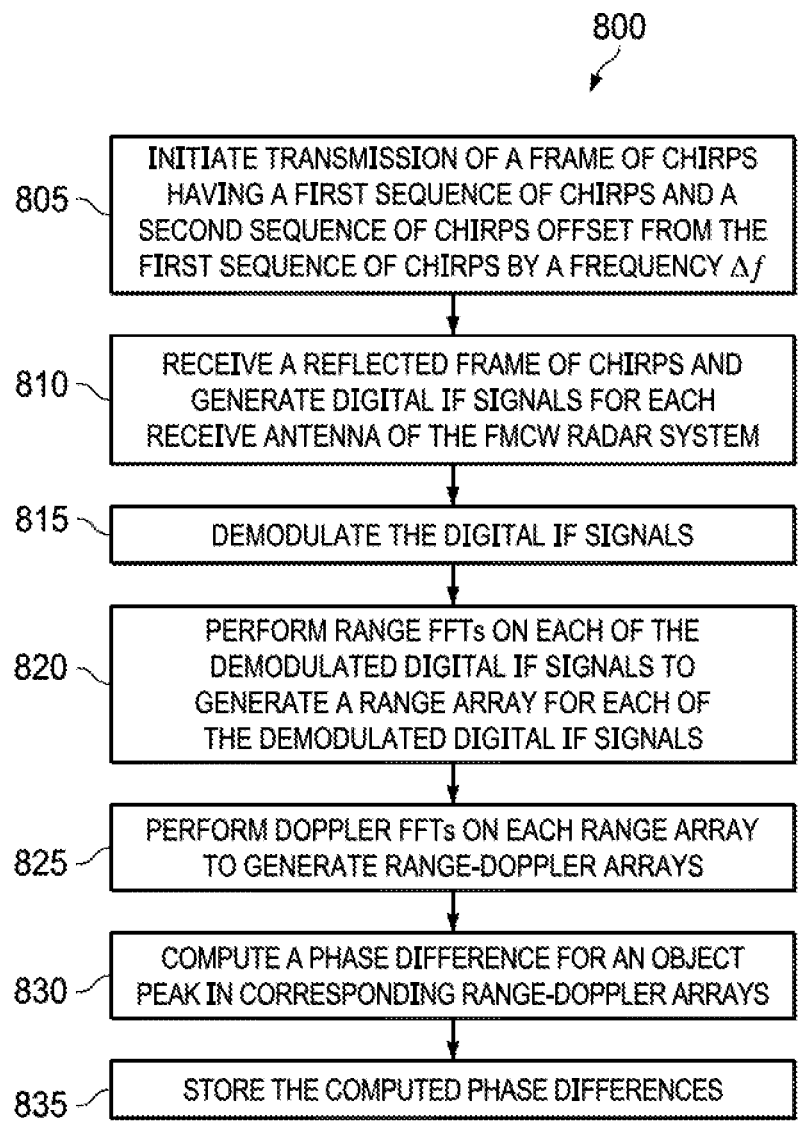
FIG. 8 shows a flowchart of an illustrative method for calibrating a FMCW radar system.

Referring now to FIG. 8, a flowchart of an illustrative method 800 for calibrating a FMCW radar system is shown. In at least some examples, the method 800 is implemented by a FMCW radar system during a calibration operation mode of the FMCW radar system. In at least one example, the FMCW radar system may be the FMCW radar system 200 of FIG. 2, for example, at least partially by a radar transceiver IC, such as the radar transceiver IC 205 of FIG. 2 and/or radar transceiver IC 300 of FIG. 3.

At operation 805, the FMCW radar system begins the calibration process by initiating transmission of a frame of chirps having a first sequence of chirps and a second sequence of chirps offset from the first sequence of chirps by Δf. The initiation of transmission of the frame of chirps may be performed by the FMCW radar system in a manner substantially similar to operation 405 of the method 400, discussed above, the details of which are not repeated herein.

At operation 810, the FMCW radar system receives a reflected frame of chirps and generates digital IF signals for each receive antenna of the FMCW radar system. The receipt of the reflected frame of chirps and generation of the digital IF signals may be performed by the FMCW radar system in a manner substantially similar to operation 410 of the method 400, discussed above, the details of which are not repeated herein.

At operation 815, the FMCW radar system demodulates the digital IF signals. The demodulation of the digital IF signals may be performed by the FMCW radar system in a manner substantially similar to operation 415 of the method 400, discussed above, the details of which are not repeated herein.

At operation 820, the FMCW radar system performs range FFTs on each of the results of operation 815 to generate a range array for each of the results of operation 815. The generation of the range arrays may be performed by the FMCW radar system in a manner substantially similar to operation 420 of the method 400, discussed above, the details of which are not repeated herein.

At operation 825, the FMCW radar system performs Doppler FFTs on each range array to generate range-Doppler arrays. The generation of the range-Doppler arrays may be performed by the FMCW radar system in a manner substantially similar to operation 425 of the method 400, discussed above, the details of which are not repeated herein.

At operation 830, the FMCW radar system computes a phase difference for an object peak in corresponding range-Doppler arrays. The FMCW radar system computes the phase difference, for example, by subtracting the phase of the object peak in one range-Doppler array (e.g., a range-Doppler array corresponding to a chirp of the first sequence of chirps) from a phase of the object peak in another range-Doppler array (e.g., corresponding to the second sequence of chirps offset from the first sequence of chirps by Δf). In at least one example, a search may be performed in each of the range-Doppler arrays to locate the object peak. Because the stationary object is known, the approximate location of a peak or peaks corresponding to the object may be known. Thus, the search can be performed in the approximate area of each of the range-Doppler arrays to locate the peak. Further, if the object is large, there may be many peaks corresponding to the object. If there are multiple peaks, any of the peaks may be used.

At operation 835, the computed phase difference may be stored by the FMCW radar system. In at least one example, the computed phase difference may be referred to as the systematic phase offset for a particular receive channel over which the reflected frame of chirps was received at operation 810. In at least one example, the FMCW radar system may use the systematic phase offset determined during the calibration of method 800 in performing velocity computations during normal operation of the FMCW radar system (e.g., such as when the FMCW radar system implements method 700).

For example, as part of the velocity computation for an object, the systematic phase offset may be used in the computation of $v_{est2}$ as described in reference to the method of FIG. 7. In at least one example, the systematic phase offset for a receive channel is subtracted from the phase difference computed for the receive channel prior to computing the average of the phase differences when the FMCW radar system includes multiple receive channels. The systematic phase offsets may also be used as part of the velocity computation for an object as described in reference to the method of FIG. 4. For example, the systematic phase offsets may be applied to corresponding range arrays generated prior to interleaving the range arrays.

Figure 9:
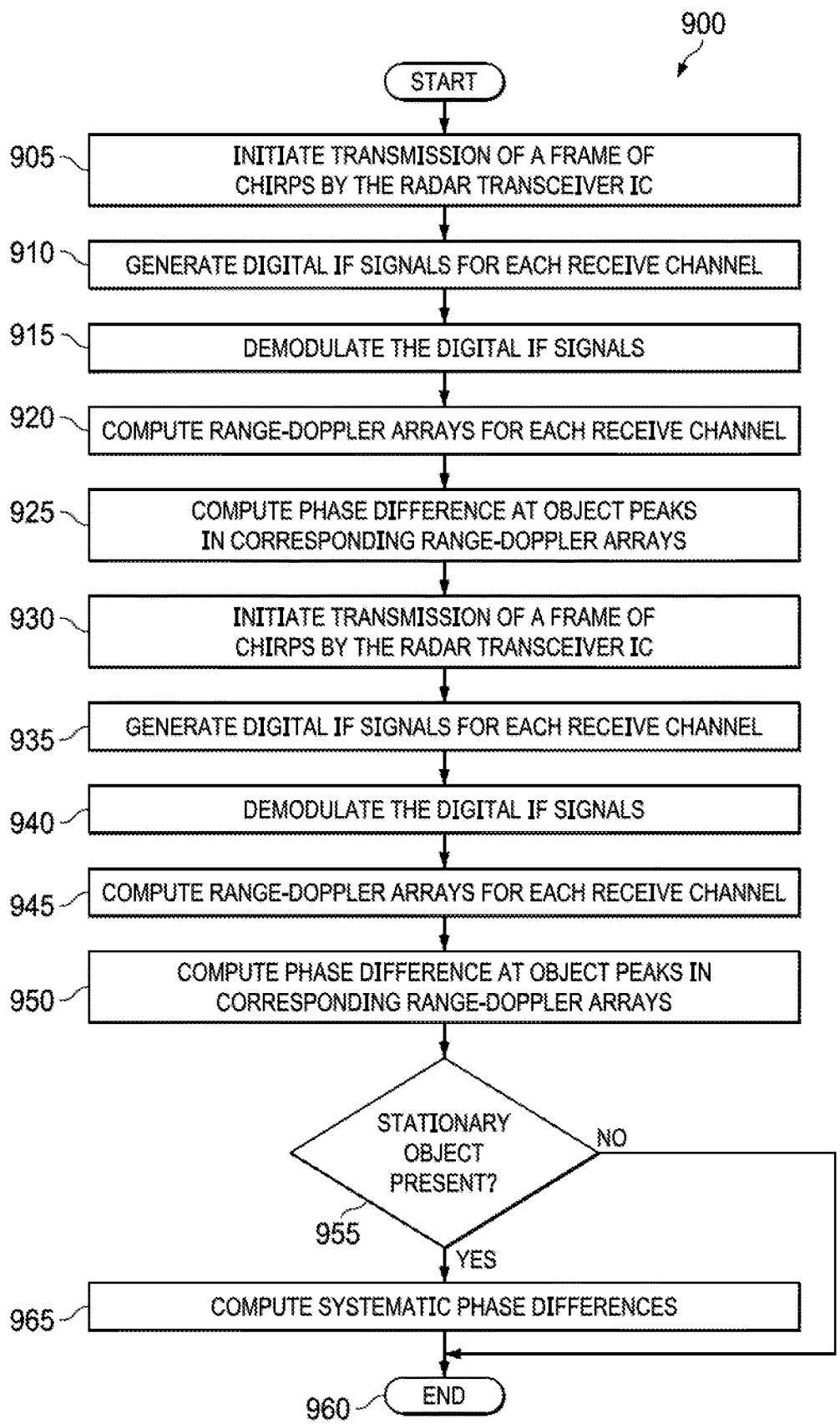
FIG. 9 shows a flowchart of an illustrative method for calibrating a FMCW radar system.

Referring now to FIG. 9, a flowchart of an illustrative method 900 for calibrating a FMCW radar system is shown. In at least some examples, the method 900 is implemented by a FMCW radar system during a normal operation mode of the FMCW radar system. In various examples, the method 900 may be performed periodically, on command, and/or when the radar system is initialized. In at least one example, the FMCW radar system may be the FMCW radar system 200 of FIG. 2, for example, at least partially by a radar transceiver IC, such as the radar transceiver IC 205 of FIG. 2 and/or radar transceiver IC 300 of FIG. 3.

In at least one example, the calibration process begins with the transmission of a frame of chirps at operation 905 by the radar transceiver IC. The frame of chirps may include a first sequence of chirps and a second sequence of chirps offset from the first sequence of chirps by $\Delta f_1$. Any suitable value of $\Delta f_1$ may be used. At operation 910, digital IF signals are generated for each receive channel of the FMCW radar system as the reflected chirps are received.

At operation 915, the digital IF signals are demodulated and at operation 920, range-Doppler arrays are computed for each receive channel. When the range-Doppler arrays are available, at operation 925, phase differences of object peaks in the range-Doppler arrays are computed. For example, for each corresponding receive channel pair, the difference between the phase of an object peak in the range-Doppler array resulting from the first sequence of chirps in the frame of chirps and the phase of the object peak in the range-Doppler array resulting from the second sequence of chirps in the frame of chirps is computed (e.g., one phase value is subtracted from the other).

At operation 930, the transmission of another frame of chirps is initiated by the radar transceiver IC. The frame of chirps may include a first sequence of chirps and a second sequence of chirps offset form the first sequence of chirps by 66 $f_2$. Any suitable value of $\Delta f_2$ may be used. At operation 935, digital IF signals are generated for each receive channel of the FMCW radar system as the reflected chirps are received.

At operation 940, the digital IF signals are demodulated and at operation 945, range-Doppler arrays are computed for each receive channel. When the range-Doppler arrays are available, at operation 950, phase differences of object peaks in the range-Doppler arrays are computed. For example, for each corresponding receive channel pair, the difference between the phase of an object peak in the range-Doppler array resulting from the first sequence of chirps in the frame of chirps and the phase of the object peak in the range-Doppler array resulting from the second sequence of chirps in the frame of chirps is computed (e.g., one phase value is subtracted from the other).

At operation 955, a determination is then made as to whether or not a stationary object is present in the scene based on the two object peak phase differences. For example, for an object peak appearing in both of the range-Doppler arrays, the difference between each phase difference of the phase differences determined for the peak using frequency offset $\Delta f_1$ and the respective phase difference of the phase differences determined for the peak using frequency offset $\Delta f_2$ is compared to a threshold determined by the signal-to-noise ratio. If each of the differences is less than the threshold, then the peak corresponds to a stationary object. Object peaks may be searched until a peak corresponding to a stationary object is found or all object peaks have been considered. If no stationary object is present, at operation 960 the method 900 terminates.

If a peak corresponding to a stationary object is found, at operation 965 the systematic phase offsets are computed based on the phase differences determined for the peak using frequency offset $\Delta f_1$ and the phase differences determined for the peak using frequency offset $\Delta f_2$. For example, corresponding phase differences are averaged to determine the systematic phase offsets, one for each corresponding pair of receive channels. The systematic phase offsets are stored for use in the velocity computations performed during normal operation of the FMCW radar system, for example, as described above.

In some examples, if multiple object peaks correspond to the stationary object, systematic phase offsets are also determined for these peaks. In such embodiments, the final systematic phase offsets are determined by averaging corresponding systematic phase offsets of all the peaks.

In the case of real receivers, the first and second sequences of chirps may have a frequency offset of $\Delta f$ such that the digital IF signal has the first sequence information at 0 to $F_{farthest}$ and second sequence at $\Delta f$ to $\Delta f+F_{farthest}$. In the case of complex receivers, the same approach may be followed, or the first sequence may be made to correspond to 0 to $F_{farthest}$ and second sequence to $-\Delta f$ to $-\Delta f+F_{farthest}$. The latter approach, in some examples, conserves bandwidth of the complex receiver (e.g., reduces implementation area and power consumption) by relying on the fact that the complex receiver provides natural image suppression (e.g., +X hertz (Hz) components do not affect–X Hz frequency components or affect after a significant image suppression offered by the complex receiver).

While the operations of the various methods of the present disclosure have been discussed and labeled with numerical reference, each of the various methods may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., MOSFET, NMOS, PMOS, etc.), these components may be exchanged for components of other process technologies (e.g., replace MOSFET with bi-polar junction transistor (BJT), replace NMOS with PMOS or vice versa, etc.) and reconfiguring circuits including the replaced components to provide desired functionality at least partially similar to functionality available prior to the component replacement. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A radar system, comprising:
a radar transceiver integrated circuit (IC), comprising:
a local oscillator configured to generate a frame including a first sequence of chirps; and
a modulator coupled to the local oscillator, the modulator configured to modulate the first sequence of chirps to generate a second sequence of chirps such that the frame includes the first sequence of chirps and the second sequence of chirps offset by a first frequency value; and a processing element configured to:
compute a first velocity estimate for an object within a field of view of the radar system based on a range-Doppler array;
compute a second velocity estimate for the object based on a difference between a phase of at least one peak in a first range-Doppler array for the first sequence of chirps and a phase of at least one peak in a second range-Doppler array for the second sequence of chirps; and
compute a final velocity estimate for the object based on the first velocity estimate and the second velocity estimate.

2. The radar system of claim 1, further comprising a timing engine configured to generate one or more chirp control signals,
wherein the local oscillator is configured to generate the frame according to the one or more chirp control signals, and
wherein the radar transceiver IC further comprises a control module coupled to the timing engine and to the modulator, and wherein the control module is configured to:
transmit one or more parameter values to the timing engine to at least partially control generation of the chirp control signals; and
transmit one or more signals to the modulator to at least partially control the modulation of the first sequence of chirps.

3. The radar system of claim 1, wherein the radar transceiver IC is configured to:
receive a frame of reflected chirps, the reflected chirps comprising the first sequence of chirps and the second sequence of chirps reflected by the object;
generate a digital intermediate frequency (IF) signal corresponding to the frame of reflected chirps; and
demodulate the digital IF signal to obtain a first demodulated digital IF signal corresponding to the first sequence of chirps and a second demodulated digital IF signal corresponding to the second sequence of chirps, wherein before demodulation the first sequence of chirps is offset in the digital IF signal from the second sequence of chirps by the first frequency value.

4. The radar system of claim 3, wherein the range-Doppler array on which computation of the first velocity estimate is based is one of the first range-Doppler array, the second range-Doppler array, and a relationship between the first and second range-Doppler array, and wherein the processing element is configured to:
perform a range fast Fourier transform (FFT) on the first demodulated digital IF signal and on the second demodulated digital IF signal to generate a first range array for the first demodulated digital IF signal and a second range array for the second demodulated digital IF signal; and
perform Doppler FFTs on the first range array and on the second range array to generate the first range-Doppler array corresponding to the first range array and the second range-Doppler array corresponding to the second range array.

5. The radar system of claim 4, wherein to compute the second velocity estimate, the processing element is configured to subtract a phase of a first peak of the first range-Doppler array from a phase of a second peak of the second range-Doppler array.

6. The radar system of claim 1,
wherein the frame while containing the first sequence of chirps is associated with a first maximum measurable velocity, and
wherein the frame while containing the first sequence of chirps and the second sequence of chirps is associated with a second maximum measurable velocity greater than the first maximum measurable velocity.

7. The radar system of claim 1,
wherein the radar system is configured to operate in a calibration mode to determine a systematic phase offset between receive channels of the radar transceiver IC, and
wherein the processing element is configured to determine the final velocity estimate of the object based on the systematic phase offset.

8. The radar system of claim 1, wherein the first sequence of chirps and the second sequence of chirps are described by $1+e^{j2\pi\Delta ft}$, wherein $\Delta f$ the first frequency value, and wherein t is representative of time.

9. The radar system of claim 1, wherein the first sequence of chirps and the second sequence of chirps are transmitted using a same antenna of the radar system.

10. The radar system of claim 1, further comprising an antenna, wherein the radar transceiver IC is configured to cause the antenna to:
transmit the first sequence of chirps; and
transmit the second sequence of chirps at a same time as the antenna transmits the first sequence of chirps.

11. A method for determining an approximate velocity in a radar system, the method comprising:
initiating transmission, via a transmission channel, of a frame of chirps having a first sequence of chirps and a second sequence of chirps offset from the first sequence of chirps by a frequency ($\Delta f$), wherein initiating transmission of the frame of chirps having the first sequence of chirps and the second sequence of chirps offset from the first sequence of chirps by $\Delta f$ comprises:
generating one or more chirp control signals according to chirp parameter values;
generating a frame including the first sequence of chirps according to the one or more chirp control signals, the frame including the first sequence of chirps and being associated with a first maximum measurable velocity; and
modulating the first sequence of chirps to generate a second sequence of chirps such that the frame contains the first sequence of chirps and the second sequence of chirps offset by the $\Delta f$, the frame including the first sequence of chirps and the second sequence of chirps and being associated with a second maximum measurable velocity greater than the first maximum measurable velocity;
receiving, via a receive channel, a frame of reflected chirps, the reflected chirps comprising the first sequence of chirps and the second sequence of chirps reflected by an object within a field of view of the radar system;
generating, via the receive channel, a digital intermediate frequency (IF) signal corresponding to the frame of reflected chirps; demodulating, via a processor, the digital IF signal to form a first demodulated IF signal corresponding to the first sequence of chirps and a second demodulated IF signal corresponding to the second sequence of chirps; and
determining, via the processor, the approximate velocity at least partially according to the first demodulated IF signal and the second demodulated IF signal.

12. The method of claim 11, wherein determining the approximate velocity for an object in a field of view of the radar system at least partially according to the first demodulated IF signal and the second demodulated IF signal comprises:
performing a range fast Fourier transform (FFT) on the first demodulated IF signal and the second demodulated IF signal to generate a first range array corresponding to the first demodulated IF signal and a second range array corresponding to the second demodulated IF signal; and
performing Doppler FFTs on the first range array and the second range array to generate a first range-Doppler array and a second range-Doppler array.

13. The method of claim 12, further comprising determining the approximate velocity of the object within the field of view of the radar system using at least one of the first range-Doppler array or the second range-Doppler array by:
computing a first velocity estimate for the object within the field of view of the radar system based on at least one of the first range-Doppler array or the second range-Doppler array;
computing a second velocity estimate for the object within the field of view of the radar system based on phase differences of a peak corresponding to the object within the field of view of the radar system in the first range-Doppler array and the second range-Doppler array; and
computing the approximate velocity of the object based on the first velocity estimate and the second velocity estimate.

14. The method of claim 13, further comprising operating in a calibration mode to determine a systematic phase offset between receive channels of a radar transceiver integrated circuit (IC), wherein the systematic phase offset is used in determining the approximate velocity of the object within the field of view of the radar system.

15. The method of claim 11, wherein the first sequence of chirps and the second sequence of chirps are described by $1+e^{j2\pi\Delta ft}$, and wherein t is representative of time.

16. The method of claim 11, wherein before demodulation the second sequence of chirps is offset in the digital IF signal from the first sequence of chirps by the $\Delta f$.

17. A method for determining a velocity in a radar system, the method comprising:
computing, via a processing element, a first velocity estimate based on at least one range-Doppler array obtained based on transmitting a frame of chirps having a first sequence of chirps and a second sequence of chirps offset from the first sequence of chirps by a frequency ($\Delta f$);
computing, via the processing element, a second velocity estimate based on phase differences of a first peak in the at least one range-Doppler array and a second peak in at least a second range-Doppler array corresponding to the first peak, wherein the at least second range-Doppler array is obtained based on transmitting the frame of chirps having the first sequence of chirps and the second sequence of chirps offset from the first sequence of chirps by the $\Delta f$; and computing, via the processing element, the velocity based on the first velocity estimate and the second velocity estimate.

18. The method of claim 17, wherein the second sequence of chirps is offset from the first sequence of chirps by modulating the first sequence of chirps according to $1+e^{j2\pi\Delta ft}$ using an I/Q modulator, and wherein t is representative of time.

19. The method of claim 18, wherein modulating the first sequence of chirps such that the first sequence of chirps and the second sequence of chirps are described according to $1+e^{j2\pi\Delta ft}$ increases a maximum measurable velocity of the radar system by a factor of approximately $$\frac{T_C}{\Delta T},$$

wherein $T_C$ is a periodicity of the first sequence of chirps and the second sequence of chirps, wherein $$\Delta T = \frac{\Delta f}{s},$$

and wherein s is the slope of the first sequence of chirps.

20. The method of claim 17, wherein computing the velocity based on the first velocity estimate and the second velocity estimate comprises:
   determining an ambiguity associated with the first velocity estimate and the second velocity estimate; and
   calculating the velocity of an object in a field of view of the radar system based on the first velocity estimate, the second velocity estimate, and the determined ambiguity.

* * * * *